US008369873B2

(12) United States Patent
Krasner

(10) Patent No.: US 8,369,873 B2
(45) Date of Patent: Feb. 5, 2013

(54) METHOD FOR DETERMINING A CHANGE IN A COMMUNICATION SIGNAL AND USING THIS INFORMATION TO IMPROVE SPS SIGNAL RECEPTION AND PROCESSING

(75) Inventor: Norman F. Krasner, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 11/836,643

(22) Filed: Aug. 9, 2007

(65) Prior Publication Data

US 2008/0158051 A1  Jul. 3, 2008

Related U.S. Application Data

(63) Continuation of application No. 09/619,775, filed on Jul. 20, 2000, now Pat. No. 7,257,417.

(60) Provisional application No. 60/144,610, filed on Jul. 20, 1999.

(51) Int. Cl.
*H04W 24/00* (2009.01)

(52) U.S. Cl. ............. 455/456.3; 455/456.1; 455/3.02; 342/357.78; 342/358

(58) Field of Classification Search .......... 455/456.3, 455/441, 424, 425, 456.5, 456.6, 561, 550.1, 455/575.1, 337.01, 506, 226.2, 443, 436, 455/437, 404.2, 433, 412.2, 414.2, 440, 456.1, 455/407, 67.11, 408, 98, 100, 164.1, 192.1, 455/173.1; 342/352, 357.02, 358, 357.09, 342/375.15, 357.12, 357.1, 357.06; 364/449; 701/207, 214, 213, 209, 13, 200; 375/150, 375/343; 370/252, 316

See application file for complete search history.

(56) References Cited

U.S. PATENT DOCUMENTS

| | | | | |
|---|---|---|---|---|
| 4,821,294 A * | 4/1989 | Thomas, Jr. | .................. | 375/343 |
| 5,036,329 A | 7/1991 | Ando | | |
| 5,043,737 A * | 8/1991 | Dell-Imagine | ................ | 342/358 |
| 5,119,101 A * | 6/1992 | Barnard | .................... | 342/357.05 |
| 5,144,318 A * | 9/1992 | Kishi | ........................ | 342/357.15 |
| 5,239,667 A | 8/1993 | Kanai | | |

(Continued)

FOREIGN PATENT DOCUMENTS

| | | |
|---|---|---|
| EP | 0429769 | 6/1991 |
| EP | 0532485 | 3/1993 |

(Continued)

OTHER PUBLICATIONS

International Search Report—PCT/US2000/019905, International Search Authority—European Patent Office—Nov. 3, 2000.

(Continued)

*Primary Examiner* — Duc Nguyen
*Assistant Examiner* — Charles Chow
(74) *Attorney, Agent, or Firm* — Linda G. Gunderson

(57) ABSTRACT

Methods and apparatuses for determining a position of a mobile satellite positioning system (SPS) receiver which is coupled to a communication receiver or transceiver. In one exemplary method, a change in a communication signal received by the communication receiver is determined. A parameter, based on the change, is determined, and SPS signals from SPS satellites are processed according to the parameter. According to further details of this method, the change involves the fluctuation of the level of the communication signal and the parameter is a motion information which specifies a frequency range for searching for SPS signals in the process of acquiring the SPS signals from SPS satellites. In an alternative embodiment the change in the communication signal is a change in the transmitted signal in response to power control commands. Apparatuses, such as a mobile communication system which includes an SPS receiver and a communication receiver, are also described.

20 Claims, 6 Drawing Sheets

U.S. PATENT DOCUMENTS

| | | | | |
|---|---|---|---|---|
| 5,379,324 | A | 1/1995 | Mueller et al. | |
| 5,381,338 | A | 1/1995 | Wysocki et al. | |
| 5,396,253 | A * | 3/1995 | Chia | 342/104 |
| 5,446,465 | A * | 8/1995 | Diefes et al. | 342/357.08 |
| 5,510,797 | A | 4/1996 | Abraham et al. | |
| 5,548,296 | A | 8/1996 | Matsuno | |
| 5,585,805 | A | 12/1996 | Takenaka et al. | |
| 5,771,456 | A | 6/1998 | Pon | |
| 5,774,829 | A | 6/1998 | Cisneros et al. | |
| 5,812,087 | A | 9/1998 | Krasner | |
| 5,841,396 | A | 11/1998 | Krasner | |
| 5,859,612 | A | 1/1999 | Gilhousen | |
| 5,874,913 | A * | 2/1999 | Blanchard et al. | 342/352 |
| 5,883,594 | A | 3/1999 | Lau | |
| 5,917,444 | A * | 6/1999 | Loomis et al. | 342/357.75 |
| 6,023,242 | A * | 2/2000 | Dixon | 342/359 |
| 6,061,019 | A * | 5/2000 | Miyoshi | 342/359 |
| 6,111,538 | A | 8/2000 | Schuchman et al. | |
| 6,278,404 | B1 * | 8/2001 | Niles | 342/359 |
| 6,285,884 | B1 | 9/2001 | Vaara | |
| 6,313,786 | B1 | 11/2001 | Sheynblat et al. | |
| 6,317,612 | B1 * | 11/2001 | Farsakh | 455/67.11 |
| 6,377,813 | B1 * | 4/2002 | Kansakoski et al. | 455/522 |
| 6,400,310 | B1 * | 6/2002 | Byrnes et al. | 342/115 |
| 6,542,745 | B1 * | 4/2003 | Mottier et al. | 455/441 |
| 6,546,040 | B1 * | 4/2003 | Eschenbach | 375/140 |
| 6,577,603 | B1 * | 6/2003 | Hakalin et al. | 370/252 |
| 6,704,650 | B1 * | 3/2004 | Fuller et al. | 701/213 |
| 7,193,559 | B2 * | 3/2007 | Ford et al. | 342/357.14 |
| 7,257,417 | B1 * | 8/2007 | Krasner | 455/456.3 |
| 7,280,071 | B2 * | 10/2007 | Awata | 342/357.15 |
| 2003/0231704 | A1 * | 12/2003 | Tanaka et al. | 375/150 |

FOREIGN PATENT DOCUMENTS

| | | |
|---|---|---|
| EP | 1252773 | 10/2002 |
| GB | 2305825 | 4/1997 |
| JP | 03104330 | 5/1991 |
| JP | 03293577 | 12/1991 |
| JP | 04359177 | 12/1992 |
| JP | 6289117 | 10/1994 |
| JP | 09166655 | 6/1997 |
| JP | 10023532 | 1/1998 |
| JP | 10190557 | 7/1998 |
| JP | 10261989 | 9/1998 |
| JP | 11109020 | 4/1999 |
| WO | 9816079 | 4/1998 |

OTHER PUBLICATIONS

Written Opinion—PCT/US00/19905, International Search Authority, European Patent Office, Nov. 3, 2000.

* cited by examiner

METHOD FOR DETERMINING A CHANGE IN A COMMUNICATION SIGNAL AND USING THIS INFORMATION TO IMPROVE SPS SIGNAL RECEPTION AND PROCESSING

This application is a continuation of and hereby claims the benefit of the filing date of U.S. patent application Ser. No. 09/619,775, filed Jul. 20, 2000 by Norman F. Krasner and entitled "Method for Determining A Change in A Communication Signal And Using This Information To Improve SPS Signal Reception And Processing," which is assigned to the assignee hereof.

BACKGROUND

It is known that the motion of mobile satellite position system (SPS) receivers (e.g. a Global Positioning System receiver), particularly while attempting to acquire SPS signals from an SPS satellite, will effect the position determination function of the SPS receiver. The faster the velocity of the mobile SPS receiver, the more time consuming is the acquisition/search process. Tracking (after acquisition) of SPS signals is also effected by faster velocities of the mobile SPS receiver. These problems are caused by Doppler effects from the motion of the SPS receiver, which are compounded by the motion of the orbiting SPS satellites which are moving at high velocities. Several techniques are known in the art for predicting the Doppler effects due to the motion of the SPS satellites. These techniques are particularly useful for stationary SPS receivers (which may be capable of moving). Such techniques are described in U.S. Pat. Nos. 4,445,118 and 5,841,396; and PCT Publication No. WO 98/25157. These techniques usually assume that the SPS receiver is essentially stationary (e.g. fixed on the surface of the earth or moving slowly, such as the speed of a person walking). When the SPS receiver is moving in a car, the effective Doppler effect due to the rapid movement of the SPS receiver, may be considerably different than an estimated Doppler for a stationary SPS receiver. Thus, the techniques in the prior art, while normally helpful for many situations, may not be advantageous when the SPS receiver is moving at high velocities.

SUMMARY OF THE INVENTION

The present invention relates to methods and apparatuses for determining a change in a communication signal and using information related to this change to affect the processing (e.g. reception of) SPS signals. In one exemplary method, a change in a communication signal received by a communication receiver is determined. A parameter, based on the change, is determined, and SPS signals from SPS satellites are processed according to the parameter. For example, the parameter may be representative of a motion information which may be used to determine a frequency range for searching for SPS signals in the process of acquiring the SPS signals from at least one SPS satellite. Examples of such motion information include a fade rate or time between fades of the envelope of the communication signal. In an alternative example, a change in the level of the communication signal transmitted by a communication transceiver is monitored, or the commands for altering such a level are monitored.

Apparatuses are also described, such as a mobile communication system which includes an SPS receiver and a communication receiver.

BRIEF DESCRIPTION OF THE DRAWINGS

The present invention is illustrated by way of example, and not by limitation, in the figures of the accompanying drawings in which like references indicate similar elements.

DETAILED DESCRIPTION

Figure 1:
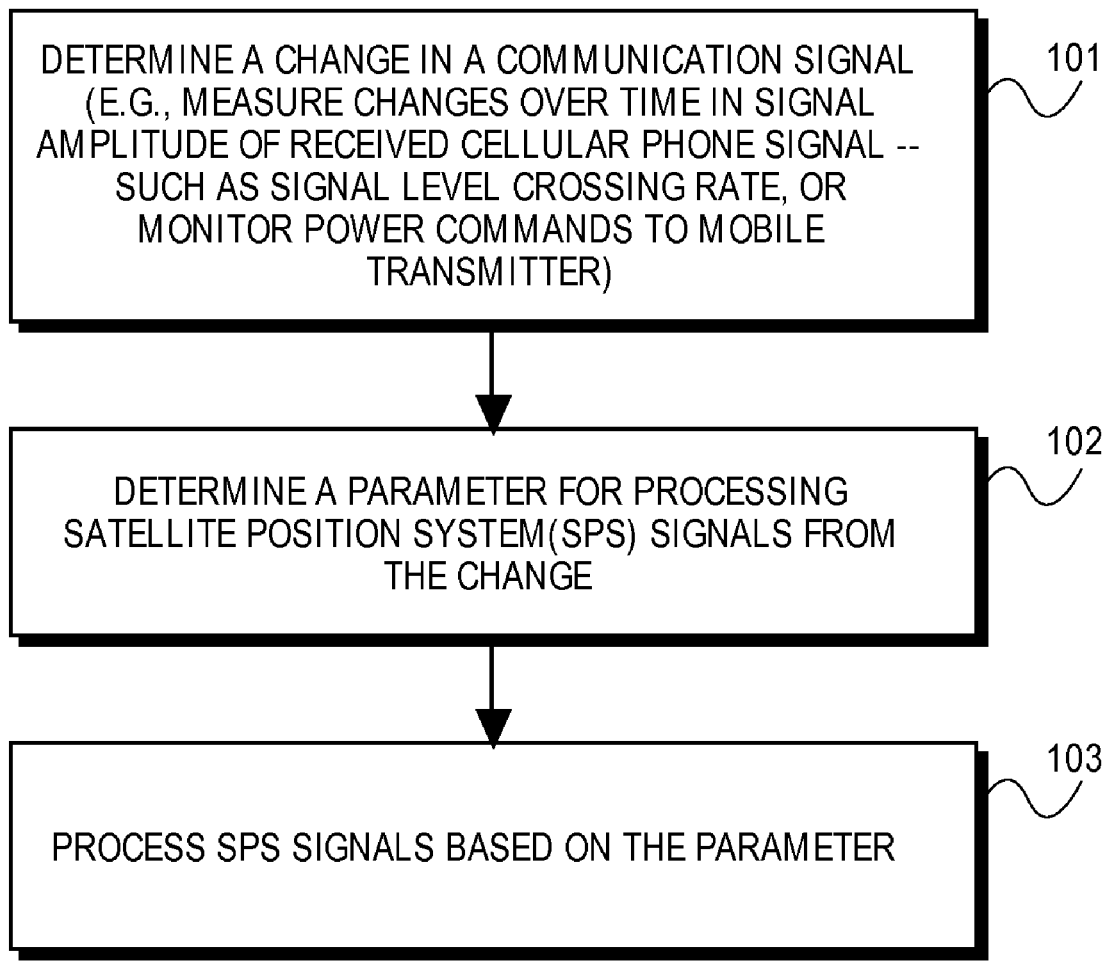
FIG. 1 shows a flowchart which depicts an exemplary method according to one aspect of the present invention.

Methods and apparatuses signals are described for determining a change in a communication signal and using information related to this change in processing SPS. The following description and drawings are illustrative of the invention and are not to be construed as limiting the invention. In the following description, for purposes of explanation, numerous specific details are set forth in order to provide a thorough understanding of the present invention. It will be evident, however, to one skilled in the art that the present invention may be practiced without these specific details. In other instances, well known structures and devices are shown in block diagram form to facilitate explanation.

This invention, in one embodiment, deals with processing satellite positioning system (SPS) signals, such as GPS (Global Positioning System) signals from GPS satellites, when the SPS receiver is capable of undergoing movement. Under such conditions when the SPS receiver is moving, the frequencies of the GPS signals are shifted due to the Doppler effect from the motion of the SPS receiver. This makes it more difficult to acquire GPS signals and also can cause difficulties in tracking the signals. If an auxiliary source of information were available to provide motion information to the GPS receiver, the receiver could utilize this information to alter its acquisition strategies. For example, if it were known that there was little motion, then the Doppler effect (due to motion of the GPS receiver) would be minor and the GPS receiver could avoid long searches over wide Doppler regions, a process that often results in very long acquisition times.

This invention, in one embodiment, provides a method for determining such platform motion, when the GPS receiver is integrated with, or is in proximity with an operational communications device.

This invention has the advantage in that specialized external equipment used to determine motion, such as accelerometers, gyros, speedometers, etc. may be avoided. Such equipment may be expensive, require extensive installation, and may be unwieldy, especially for cost sensitive mobile consumer applications.

A preferred embodiment of the invention is a cell phone with an integrated GPS receiver. However, the invention will work equally well for cell phones or other communication devices that are in communication with a cell phone (e.g. over a serial wired link or even a short range wireless link), where the cell phone is in close proximity to the communication system and where both share similar platform motion.

A method, according to one embodiment of the invention, observes the fluctuations of the envelope or other signal parameters of the communication signal and derives from these fluctuations velocity information, which is then used to determine how to process (e.g. search for) GPS signals.

It is well known that in mobile situations cellular type signals undergo rapid signal level fluctuations due to interference from received signals provided to the mobile from several paths. For example, a cellular signal may be received directly from a cell phone tower and may be received after being reflected off the ground. Alternatively, a cell phone signal may be received from a multiplicity of reflections off nearby buildings.

In a reflection environment it is known that the probability distribution of the envelope of a received signal, especially if it is narrowband, follows a Raleigh probability distribution. Furthermore, as one moves along a line the received signal typically goes from a peak value to a small value within a distance of one-half carrier wavelength. This fading is actually statistical so that the amplitude of the envelope is nearly statistically independent between measurements when such measurements are made ½ wavelength apart. A discussion on the fading phenomena, including measurements is provided in G. A. Arrendondo, et al., "Advanced Mobile Phone Service, Voice and Data Transmission," pp. 303-315, *Bell System Technical Journal*, January 1979.

For example, at 850 MHz, a cell phone band, the independent fades are around 7 inches apart. Thus, as a vehicle or other moving platform moves, the envelope will appear to move up and down, and the average rate at which this motion occurs is a function of the speed of the platform. One measure of this rate is found by the so-called level crossing rate. The mean value of the envelope is found and a level is set a prescribed amount below it, for example 10 dB below the mean value. The number of occurrences are measured over a period of time, say 10 seconds, when the signal level drops below this lower threshold. The rate of such threshold crossings is a measure of the fade rate. For example, at around 850 MHz it can be shown that at a speed of 20 miles per hour the fade rate for a −10 dB threshold relative to the mean is around 18 times per second. An alternative measure is the average duration of fades below a threshold. At 20 miles per hour at 850 MHz the average fade duration is around 5 msec. The fade rate is proportional to the vehicle speed and is also proportional to the frequency of the received signal. Similarly, the fade duration is inversely proportional to these quantities.

Accordingly, an exemplary method of the invention monitors the received signal of a cell phone or other communication device in proximity to or integrated with a GPS receiver, and uses the fading statistics of the received communication signal's carrier, or other multipath related statistics of the received signal, to estimate the speed of the mobile platform. The estimated speed of the mobile platform is used to control the acquisition or processing of GPS signals received by the GPS receiver in proximity to the communication device. The acquisition of a GPS signal often involves a search for the signal's carrier frequency. This frequency is in turn altered by two sources of Doppler: (1) Doppler due to the GPS satellite's motion relative to the earth and (2) Doppler due to the receiver platform's motion. Knowing the platform's speed then assists in developing an appropriate acquisition strategy. For example, if the estimated speed is low (suggesting that the platform is essentially stationary), then the amount of frequency (or Doppler) searching required to acquire a GPS signal from a GPS satellite may be reduced. On the other hand, if the estimated speed is high, then the amount of such frequency searching may be increased. Intermediate levels of Doppler searching may be performed when the estimated speed is between a low level and a high level. Thus, the level of Doppler uncertainty may be determined from the estimated speed (obtained from the fading statistics) and this level of Doppler uncertainty may be used to determine the level of searching for Doppler shifts (e.g. the number of Doppler bins to search may be based on the level of Doppler uncertainty).

Models for fading phenomena for mobile systems are provided in Lee (see William C. Y. Lee, *Mobile Communications Design Fundamental*, pp. 100-105, Howard Sams & Co., 1986). The model produces equations for the number of level crossings (one direction only—e.g. positive) per second, n(R) and the time below a given level R (called the "fade duration") are:

$$n(R) = \sqrt{2\pi}\,(V/\lambda)Re^{-R^2} \tag{1}$$

$$t(R) = \frac{1 - e^{-R^2}}{\sqrt{2\pi}\,(V/\lambda)Re^{-R^2}} \tag{2}$$

Here R is the level normalized by the RMS signal level, V is the mobile velocity and $\lambda$ is the signal wavelength. Note that the level crossing rate is proportional to frequency and the fade duration is inversely proportional. For example, for a vehicle going 30 miles per hour, or 13.4 meters/sec, and a level set to 10 dB below the RMS we get for these quantities, n(R)=27.2 crossings per second and 3.49 milliseconds. Of course these numbers are averages and an individual measurement over a short period, such as one second, may differ significantly from these averages, due to statistical fluctuations and variations from the model used to predict these numbers. Nevertheless these equations are good predictors of trends.

FIG. 1 shows a flowchart depicting one generalized example of the present invention. In operation 101, a change in a communication signal is determined. This communication signal may be a cellular telephone signal which employs a code division multiple access (CDMA) technique for distinguishing between different receivers. Alternatively, it may be an AMPS analog cellular system, or a GSM time division multiple access cellular system, or even a paging type system. The change which is typically measured is a change over time in a signal amplitude or other signal level of the received communication signal. As noted above, one such measurement is the signal level crossing rate. Operation 102 determines a parameter from this change which has been measured in operation 101. This parameter is used for processing SPS signals. The processing of SPS signals occurs in operation 103, and the manner in which the SPS signals are processed is determined at least in part based upon the parameter.

Figure 2:
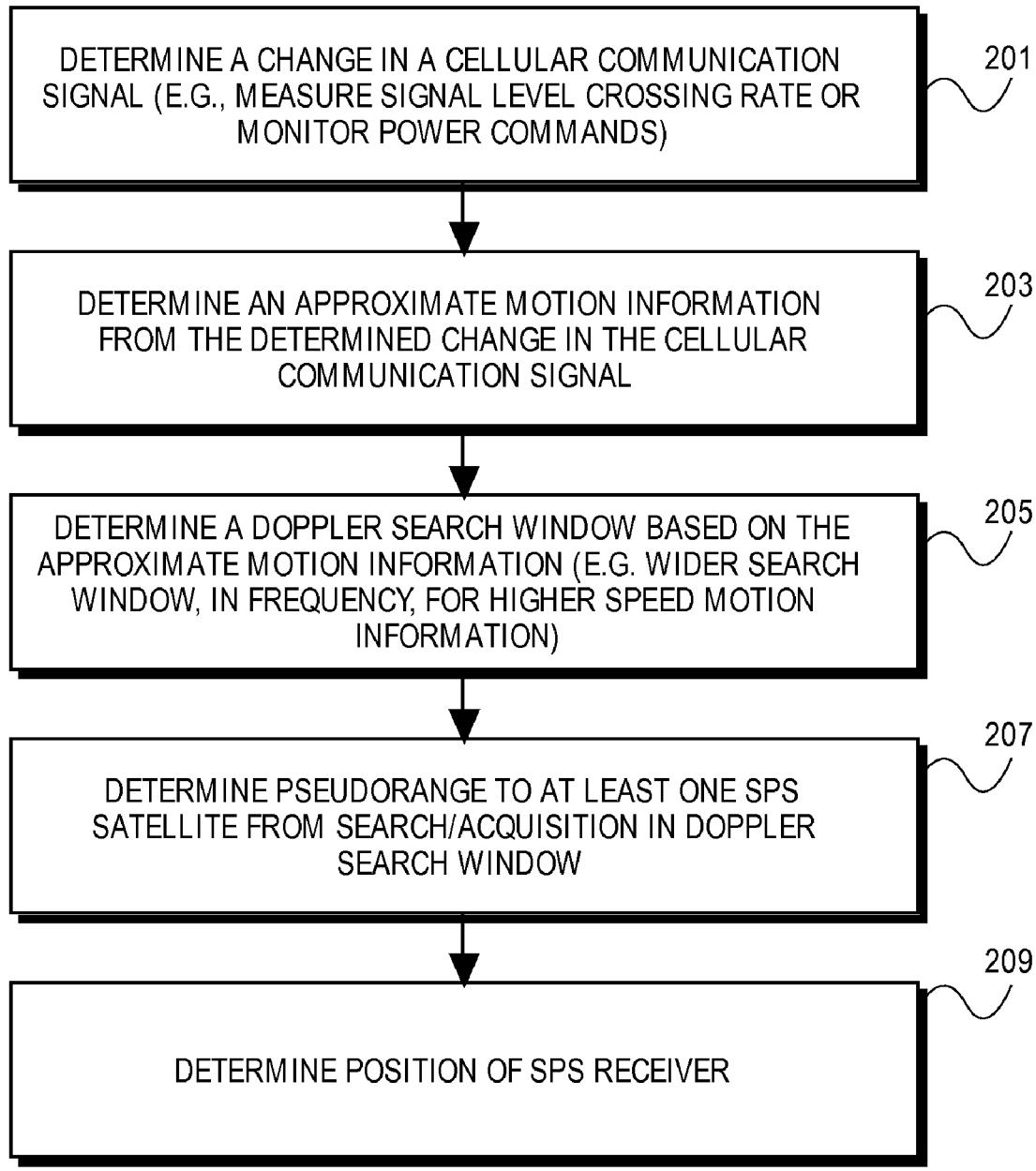
FIG. 2 shows a flowchart which shows another method according to the present invention.

FIG. 2 illustrates a more specific method according to one embodiment of the present invention. In operation 201, a change is determined in the cellular communication signal. As noted in FIG. 2, this change may be a measurement in the signal level crossing rate. In operation 203, an approximate motion information is determined from the change in the cellular communication signal. This may be performed by a lookup table or other techniques for converting from the measured information regarding the change in the cellular communication signal to an approximate motion information. For example, equations (1) and (2) may be used, or the Bell System Technical Journal referred to above shows various graphs which may be employed to convert from the change measured in operation 201 into a motion information determined in operation 203.

The motion information will then be used in operation 205 in order to determine a Doppler search window based upon the approximate motion information. Those in the art will recognize that motion information which indicate a faster speed will require a wider search window in frequency than motion information which indicate a lower speed. In operation 207, a pseudorange to at least one SPS satellite is determined by searching in this Doppler search window specified in operation 205 in order to acquire SPS signals. Then in operation 209, the position of the SPS receiver may be determined using conventional techniques.

It will be appreciated that the foregoing methods may be practiced with other techniques known in the art, including those which utilize Doppler information relative to the orbiting SPS satellites. For example, U.S. Pat. No. 5,841,396 describes a technique for providing approximate Doppler information to a mobile SPS receiver or for use with a mobile SPS receiver. This Doppler information may be used in conjunction with the approximate motion information of the present invention in order to determine an appropriate search window over an appropriate frequency range based upon the Doppler associated with the SPS satellite as well as the Doppler associated with the motion information determined according to the present invention. Furthermore, various cell based information sources may be used as described in PCT Publication No. WO 98/25157. For example, the determination of a specific cell site which is in communication with the communication receiver may specify a Doppler information with respect to at least one SPS satellite and this Doppler information may be used in conjunction with the motion information determined according to the present invention in order to specify a frequency range/search window in the acquisition process of an SPS signal. Thus, it will be appreciated that the present invention may be combined with other techniques for improving the acquisition or tracking of SPS signals such as those described in U.S. Pat. No. 5,841,396, which is hereby incorporated herein by reference, and co-pending U.S. patent application Ser. No. 08/842,559, filed Apr. 15, 1997, which is hereby incorporated herein by reference. Also, as known to those skilled in the art, the methods shown in FIGS. 1-2 may be implemented using software instructions stored on one or more computer readable media, with the instructions being configured to cause a computer to perform the functions noted and being stored, e.g., in a mobile system shown in FIG. 3.

Figure 3:
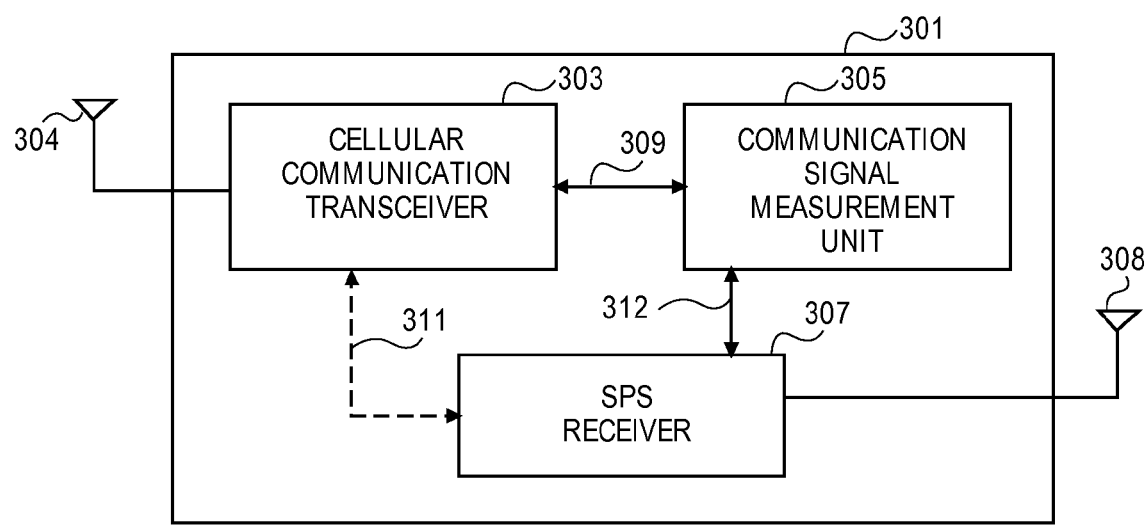
FIG. 3 shows an example of an apparatus according to the present invention.

FIG. 3 shows one embodiment of a mobile system 301 according to the present invention. The mobile system 301 includes a cellular communication transceiver 303 and an SPS receiver 307, each of which is coupled to a communication signal measurement unit 305. The communication signal measurement unit 305 is coupled by channel 309 to the cellular communication transceiver 303. It will be appreciated that the measurement unit 305 may be considered part of or integrated with the cellular communication transceiver 303. For example, many cellular communication transceivers include signal measurement units. The SPS receiver 307 is coupled to the communication signal measurement unit 305 by a channel 312 which provides a measurement or a parameter for use by the SPS receiver 307 according to the techniques and methods described herein. The SPS receiver 307 may optionally be coupled to the cellular communication transceiver 303 by an optional channel 311 which may be used to supply Doppler information or other assistance information to the SPS receiver 307 through a cellular communication link to a base station or other source (e.g. SPS servers such as those described in co-pending U.S. patent application Ser. No. 08/842,559, filed Apr. 15, 1997). Cellular communication signals are received and/or transmitted through antenna 304. SPS signals from SPS satellites are received through SPS antenna 308. It will be appreciated that in certain embodiments these antennas 304 and 308 may be shared. The SPS receiver 307 may be a conventional GPS receiver or it may be a GPS receiver such as that described in U.S. Pat. No. 6,002,363 or the GPS receivers described in U.S. Pat. No. 5,663,734. Other types of SPS receivers may also be utilized, such as conventional correlation based GPS receivers. The cellular communication transceiver 303 may be a CDMA cellular telephone transceiver or a GSM cellular telephone transceiver, an AMPS transceiver, or a variety of others commonly in use. The communication signal measurement unit 305 is coupled by channel 309 to a source in transceiver 303 to the received cellular signal in order to measure the cellular signal. The measurement of this cellular signal may be according to conventional techniques for measuring the signal level crossing rate as described herein. The measurement of this signal level crossing rate may then be used to determine a motion information as described herein. For example, a lookup table which converts from the signal level measuring rate to an estimated velocity may be performed by the measurement unit 305. This velocity may then be provided by channel 312 to the SPS receiver 307 which accordingly modifies the frequency search window for acquiring SPS signals based upon the approximate motion information specified by the measurement unit 305.

Figure 4:
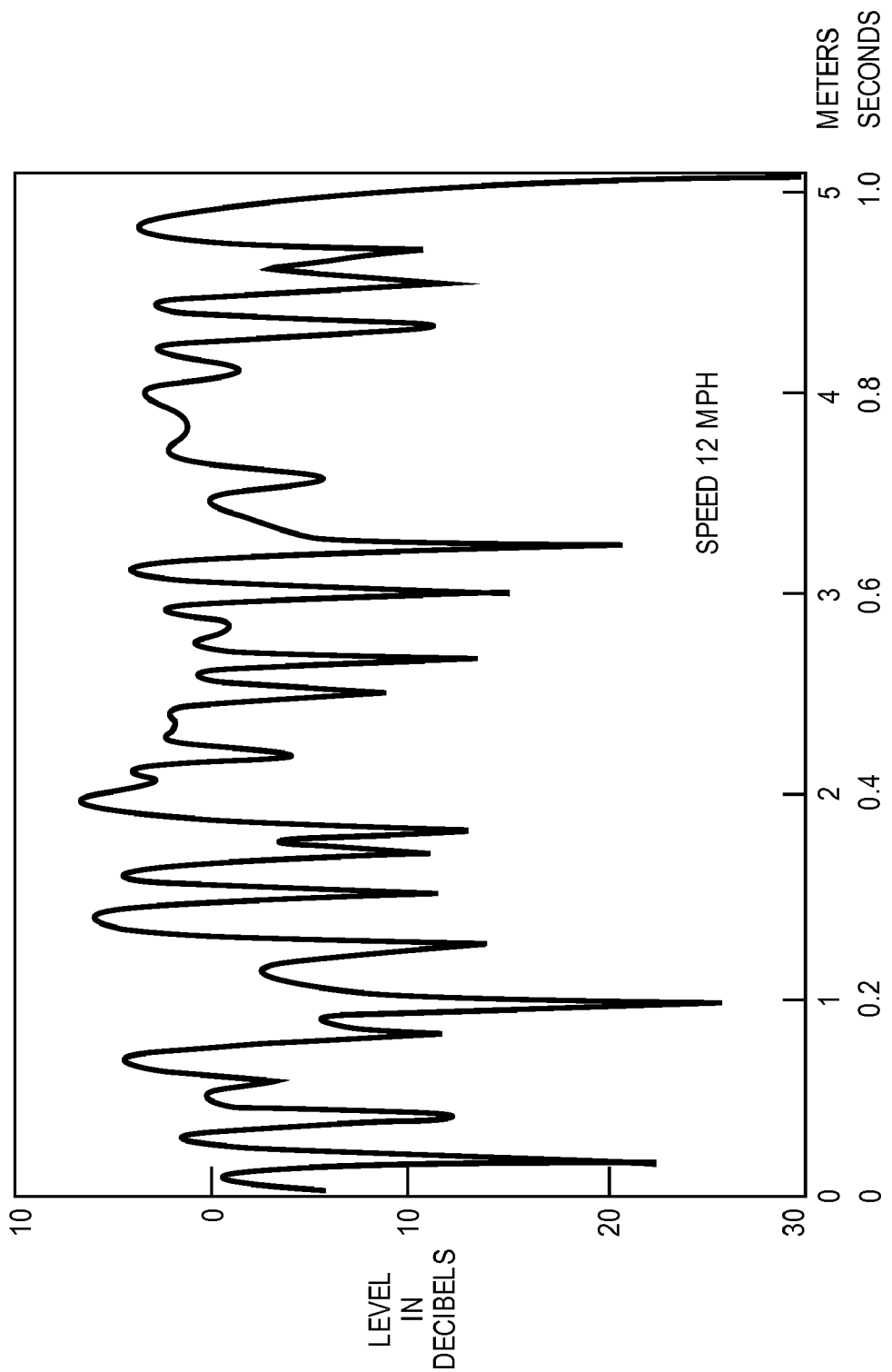
FIG. 4 shows an example of a measured Rayleigh envelope.
Figure 5:
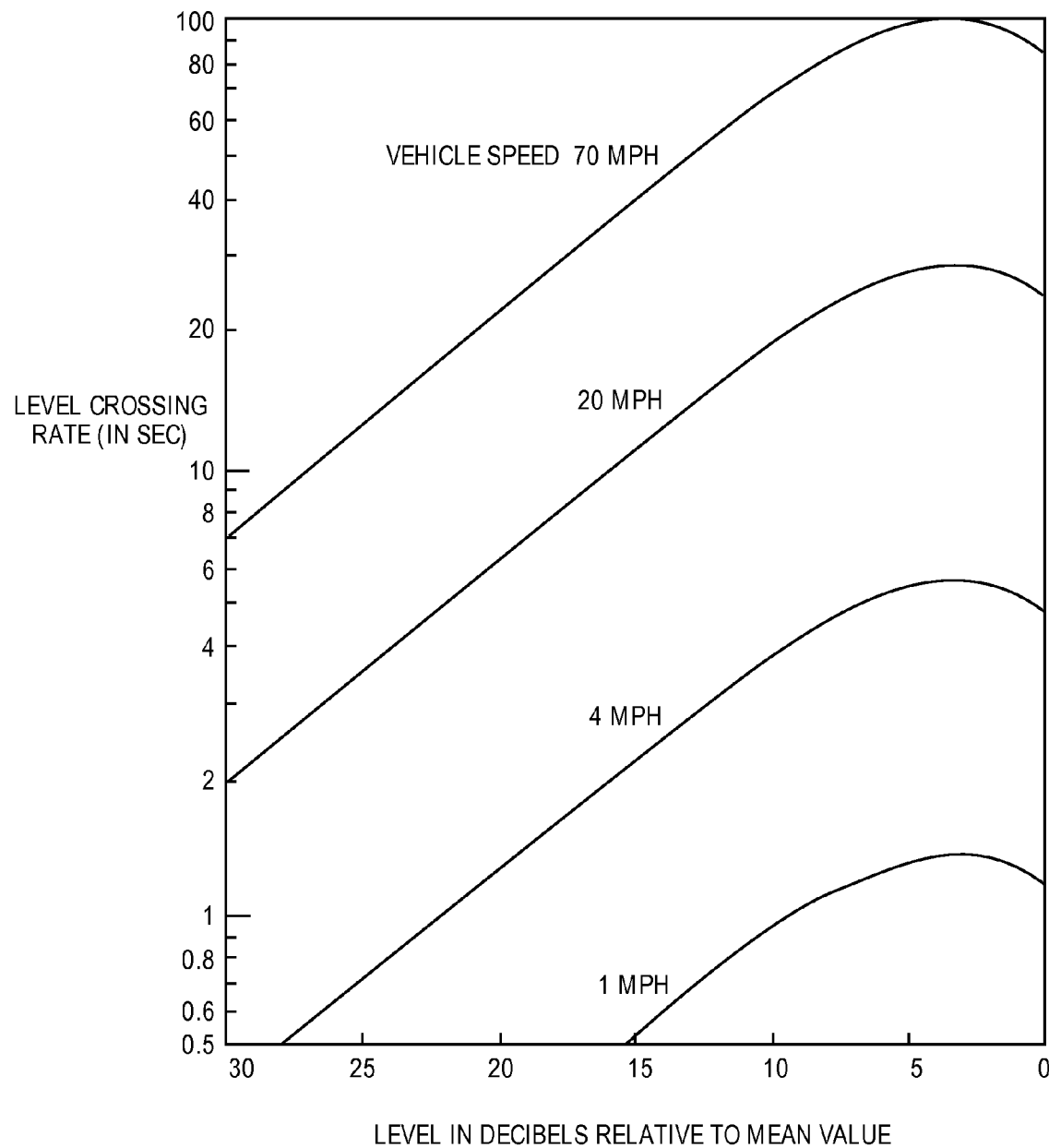
FIG. 5 shows an example of a graph depicting signal level crossing rate relative to a specified level in decibels.
Figure 6:
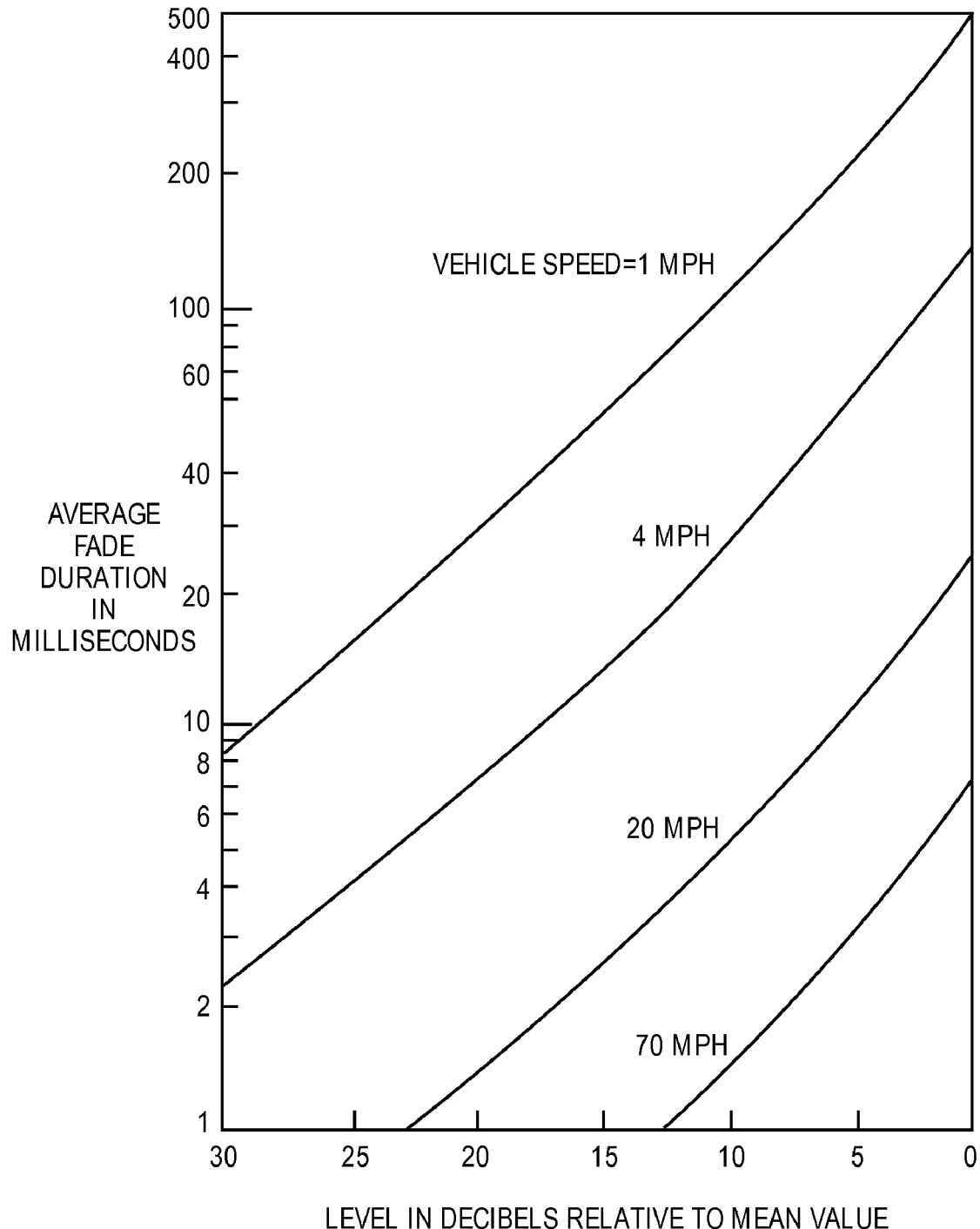
FIG. 6 shows an example of a graph depicting mean fade duration for various vehicle speeds.

FIG. 4 shows an example of a measured Rayleigh envelope where, at a speed of 12 miles per hour (MPH) the signal's level varies. This changing signal level can be measured in various ways and depicted in graphs. These graphs may be used to create lookup tables which can be used to determine the speed of a moving communication system. FIG. 5 shows an example of a graph of the signal crossing rate relative to level in decibels. A measured signal level crossing rate may be used to derive an estimated speed from graphs such as FIG. 5. FIG. 6 is an example of a graph showing mean fade duration for various vehicle speeds; a measured mean fade duration may be used to derive an estimated speed from graphs such as FIG. 6.

Other Measures of Speed

As indicated previously a variety of methods are possible to estimate the speed of the platform based upon the received communication signal's statistics. The variation in the envelope of this signal is convenient. This variation may be performed by examining an AGC control voltage or signal that is used to control the communication signal's level within the receiving chain. Often the average received signal level is provided as a measure of receiver strength, a so-called RSSI (receiver signal strength indicator). However, in some situations this RSSI is not measured at a rapid rate and hence the ability to determine rapid envelope fluctuations may be compromised.

Another method of monitoring the variation of the communication signal's strength is to monitor power control commands of the cellphone (or other mobile communication device) transmitter. In CDMA systems, it is often the case that a cellular basestation sends power control commands to the mobile and in turn the mobile's transmit power is adjusted such that the basestation receives the mobile's signal at a prescribed level. This is called closed loop power control. Often these power control commands occur at a high rate, such as once per millisecond, so that the mobile's transmitter can compensate for Rayleigh fading as observed by the basestation. The power control commands are typically up/down commands with small increments, such as 1 dB. These commands can be converted to actual transmit levels by accumulating such increments. Using this technique of monitoring the power control commands for the transmitter of the cell phone (or other communication device), a method similar to that shown in FIG. 1 or 2 may be performed to use the change in the cell phone's (or other communication system's) transmitted signal to determine a manner in which SPS signals are processed.

One should notice in the above method that the parameter that is effectively monitored is the level of the transceiver's transmitted power of the mobile rather than received power of signals received at the mobile system's receiver. Of course, in an alternative embodiment, one may directly monitor the transceiver's transmitted power rather than monitor power control commands. However, power control commands, being typically digital in nature, lend themselves to a straightforward implementation.

Although the methods and apparatus of the present invention has been described with reference to GPS satellites, it will be appreciated that the teachings are equally applicable to positioning systems which utilize pseudolites or a combination of pseudolites and satellites. Pseudolites are ground-based transmitters which broadcast a PN code (similar to the GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings, or other enclosed areas. The term satellite, as used herein, is intended to include pseudolites or equivalents of pseudolites and the term GPS signals, as used herein, is intended to include GPS-like signals from pseudolites or equivalents of pseudolites. In the preceding discussion, the invention has been described with reference to application upon the United States Global Positioning System (GPS) system. It should be evident, however, that these methods are equally applicable to similar satellite positioning systems, such as the Russian Glonass system. The term GPS used herein includes such alternative satellite positioning systems, including the Russian Glonass system. The term "GPS signals" includes signals from alternative satellite positioning systems.

Although the present invention has been described with reference to specific exemplary embodiments, it will be evident that various modifications and changes may be made to those embodiments without departing from the broader spirit and scope of the invention as set forth in the claims.

What is claimed is:

1. A mobile communication apparatus for acquiring a satellite positioning system signal, the apparatus comprising:
    means for receiving a cellular communication signal at the mobile communication apparatus;
    a measurement unit that determines a change in the received cellular communication signal resulting from motion of the mobile communication apparatus and approximates motion information of the mobile communication apparatus in accordance with the determined change;
    means for determining a Doppler search window about a predetermined signal frequency of the satellite positioning system signal based on the approximate motion information; and
    means for acquiring the satellite positioning system signal at the mobile communication apparatus using said Doppler search window.

2. The apparatus of claim 1 wherein the change in the received cellular communication signal resulting from motion of the mobile communication apparatus is the fluctuation of the received signal due to Rayleigh fading.

3. The apparatus of claim 1 wherein the change in the received cellular communication signal resulting from motion of the mobile communication apparatus is represented by power control commands that control transmit power of the mobile communication apparatus.

4. The apparatus of claim 1 wherein the change in the received cellular communication signal resulting from motion of the mobile communication apparatus is represented by the transmit power of the mobile communication apparatus.

5. The apparatus of claim 1 wherein the measurement unit comprises means for accessing a lookup table and converting the change in the received cellular communication signal to approximate motion information based on entries in the lookup table.

6. The apparatus of claim 1 wherein the approximate motion information is based on a known mathematical relationship between the approximate motion information and the change in the received cellular communication signal and a wavelength of the received cellular communication signal.

7. The apparatus of claim 1 wherein the measurement unit comprises:
    means for accessing a graph containing a representation between the change in the received cellular communication signal and approximate motion information; and
    means for interpolating the approximate motion information from a point on the graph that corresponds to the change in the received cellular communication signal.

8. The apparatus of claim 1, wherein the means for determining a Doppler search window increases a frequency range for the Doppler search window in response to the approximate motion information indicating a faster speed of the mobile communication apparatus.

9. The apparatus of claim 1, wherein the means for determining a Doppler search window determines the Doppler search window based upon Doppler associated with motion of a satellite transmitting the satellite positioning system signal and based upon Doppler associated with the approximate motion information.

10. A non-transitory computer-readable medium of a mobile communication apparatus including instructions stored thereon configured to cause a computer to acquire a satellite positioning system signal, the instructions comprising:
    instructions to determine a change in a received cellular communication signal resulting from motion of the mobile communication apparatus and determine approximate motion information in accordance with the determined change;
    instructions to determine a Doppler search window about a predetermined signal frequency of the satellite positioning system signal based on the approximate motion information; and
    instructions to acquire the satellite positioning system signal using said Doppler search window.

11. The non-transitory computer-readable medium of claim 10 wherein the change in the received cellular communication signal resulting from motion of the mobile communication apparatus is the fluctuation of the received signal due to Rayleigh fading.

12. The non-transitory computer-readable medium of claim 10 wherein the change in the received cellular communication signal resulting from motion of the mobile communication apparatus is represented by power control commands that control transmit power of the mobile communication apparatus.

13. The non-transitory computer-readable medium of claim 10 wherein the change in the received cellular communication signal resulting from motion of the mobile communication apparatus is represented by transmit power of the mobile communication apparatus.

14. The non-transitory computer-readable medium of claim 10 wherein the instructions to determine a change in a received cellular communication signal resulting from motion of the mobile communication apparatus and determine approximate motion information in accordance with the determined change comprise instructions to access a lookup table and convert the change in the received cellular communication to approximate motion information based on entries in the lookup table.

15. The non-transitory computer-readable medium of claim 10 wherein the approximate motion information is based on a known mathematical relationship between the approximate motion information and the change in the received cellular communication signal and a wavelength of the received cellular communication signal.

16. The non-transitory computer-readable medium of claim 10 wherein the instructions to determine a change in a received cellular communication signal resulting from motion of the mobile communication apparatus and determine approximate motion information in accordance with the determined change comprise:
  instructions to access a graph containing a representation between the change in the received cellular communication signal and approximate motion information; and
  instructions to interpolate the approximate motion information from a point on the graph that corresponds to the change in the received cellular communication signal.

17. The non-transitory computer-readable medium of claim 10 wherein the instructions to determine a Doppler search window comprise instructions to increase a frequency range for the Doppler search window in response to the approximate motion information indicating a faster speed of the mobile communication apparatus.

18. The non-transitory computer-readable medium of claim 10 wherein the instructions to determine a Doppler search window comprise instructions to determine the Doppler search window based upon Doppler associated with motion of a satellite transmitting the satellite positioning system signal and based upon Doppler associated with the approximate motion information.

19. A method for acquiring a satellite positioning system signal in a mobile communication apparatus, the method comprising:
  receiving a cellular communication signal at the mobile communication apparatus;
  determining a change in the received cellular communication signal resulting from motion of the mobile communication apparatus and approximating motion information of the mobile communication apparatus in accordance with the determined change;
  determining a Doppler search window about a predetermined signal frequency of the satellite positioning system signal based on the approximate motion information;
  acquiring the satellite positioning system signal at the mobile communication apparatus using said Doppler search window.

20. A mobile communication apparatus for acquiring a satellite positioning system signal, the apparatus comprising:
  a receiver configured to receive a cellular communication signal;
  a measurement unit communicatively coupled to the receiver and configured to determine a change in the received cellular communication signal resulting from motion of the mobile communication apparatus and approximate motion information of the mobile communication apparatus in accordance with the determined change; and
  a processor communicatively coupled to the measurement unit and configured to:
    determine a Doppler search window about a predetermined signal frequency of the satellite positioning system signal based on the approximate motion information; and
    acquire the satellite positioning system signal using said Doppler search window.

* * * * *